United States Patent
Yan et al.

(10) Patent No.: US 10,564,835 B2
(45) Date of Patent: *Feb. 18, 2020

(54) METHOD AND DEVICE FOR CONTROLLING USER INTERFACE

(71) Applicant: TENCENT TECHNOLOGY (SHENZHEN) COMPANY LIMITED, Shenzhen (CN)

(72) Inventors: Wei Yan, Shenzhen (CN); Jiangwei Liu, Shenzhen (CN); Yinglei Liang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 73 days.

This patent is subject to a terminal disclaimer.

(21) Appl. No.: 16/006,074

(22) Filed: Jun. 12, 2018

(65) Prior Publication Data

US 2018/0292961 A1  Oct. 11, 2018

Related U.S. Application Data

(63) Continuation of application No. 14/633,518, filed on Feb. 27, 2015, now Pat. No. 10,025,484, which is a
(Continued)

(30) Foreign Application Priority Data

Sep. 7, 2012 (CN) .......................... 2012 1 0330238

(51) Int. Cl.
 *G06F 3/0485* (2013.01)
 *G06F 3/0484* (2013.01)
 *G06F 3/0488* (2013.01)

(52) U.S. Cl.
 CPC ........ *G06F 3/0485* (2013.01); *G06F 3/04842* (2013.01); *G06F 3/0488* (2013.01)

(58) Field of Classification Search
 CPC ..................................................... G06F 3/0485
(Continued)

(56) References Cited

U.S. PATENT DOCUMENTS 9,207,849 B2 * 12/2015 Zaman ................. G06F 3/0485
2006/0056141 A1 * 3/2006 Pihlaja ................. G06F 1/1616
 361/679.01
(Continued)

FOREIGN PATENT DOCUMENTS

CN 1722069 A 1/2006
CN 1755592 A 4/2006
(Continued)

*Primary Examiner* — Reza Nabi
(74) *Attorney, Agent, or Firm* — Anova Law Group, PLLC

(57) ABSTRACT

Disclosed is a method for controlling user interface containing multiple interface elements. The method may comprise: obtaining the initiation position of the focused interface element; obtaining a first moving direction being inputted; selecting at least one interface element except the first focus interface element as a second focus interface element at the first moving direction starting from the first focus interface element; and moving the plurality of interface elements along a second moving direction opposite to the first moving direction so as to move the second focus interface element to the initial position. Therefore, it is unnecessarily for the user to frequently roll his eyes to follow the movement of the focus, thereby relieving eye fatigue.

20 Claims, 3 Drawing Sheets

Related U.S. Application Data continuation of application No. PCT/CN2013/082899, filed on Sep. 4, 2013.

(58) Field of Classification Search
USPC .......................................................... 715/830
See application file for complete search history.

(56) References Cited

U.S. PATENT DOCUMENTS

| | | | |
|---|---|---|---|
| 2011/0078560 A1* | 3/2011 | Weeldreyer | G06F 17/214 715/255 |
| 2011/0140867 A1* | 6/2011 | Maier | G06F 3/04883 340/12.22 |
| 2011/0187736 A1* | 8/2011 | Zimmer | G06T 1/20 345/589 |
| 2011/0187739 A1* | 8/2011 | Takagi | G09G 5/00 345/619 |
| 2011/0296351 A1* | 12/2011 | Ewing, Jr. | G06F 3/0346 715/841 |
| 2011/0314428 A1* | 12/2011 | Yoo | G06F 3/04883 715/863 |
| 2012/0056849 A1* | 3/2012 | Kasahara | G06F 3/044 345/174 |
| 2015/0058723 A1* | 2/2015 | Cieplinski | G06F 3/04855 715/702 |
| 2015/0169162 A1* | 6/2015 | Liu | G06F 3/04842 715/830 |
| 2016/0124707 A1* | 5/2016 | Ermilov | G06F 16/9537 345/156 |

FOREIGN PATENT DOCUMENTS

| | | |
|---|---|---|
| CN | 102124422 A | 7/2011 |
| CN | 102163207 | 8/2011 |
| CN | 102402282 A | 4/2012 |
| JP | 2011159134 | 8/2011 |
| JP | 2012009007 | 1/2012 |
| JP | 2012058883 | 3/2012 |
| KR | 20110138925 | 12/2011 |

* cited by examiner

METHOD AND DEVICE FOR CONTROLLING USER INTERFACE

CROSS-REFERENCE TO RELATED APPLICATION

This application is a continuation application of U.S. patent application Ser. No. 14/633,518, filed on Feb. 27, 2015; and U.S. patent application Ser. No. 14/633,518 claims priority to and is a continuation of PCT/CN2013/082899, filed on Sep. 4, 2013, and entitled "METHOD AND DEVICE FOR CONTROLLING USER INTERFACE", which claims the benefit of Chinese Patent Application 201210330238.1, filed with the Chinese Patent Office on Sep. 7, 2012, and entitled "INTERFACE CONTROLLING METHOD AND DEVICE", the contents of all of which are incorporated herein by reference in their entirety.

BACKGROUND

Field

The present disclosure relates to an interface controlling technology, and in particular, to an interface controlling method and device.

Description of the Related Technology

So far, interface control to a smart television or a set top box is operated through arrow keys disposed on the television per se or through a touchpad simulated by a touch panel of a remote-controller, and thus the convenient touchscreen operation mode of a smart system of the smart television cannot be used directly, that is to say, a viewing control cannot be directly chosen by clicking but can merely be chosen by moving a focus through the arrow keys and gestures operations. Therefore, how to determine the position of the focus greatly affects user experience.

In a currently predominant focus fixing method, a canvas (a parent view where the control is located) cannot be moved, and a focus is moved for choosing, therefore, the position of the focus should be changed continuously. If there are a plurality of pages of content to display, when the focus is moved continuously on a margin of a canvas, a next canvas will be displayed or a page turning operation will be implemented, which makes the user have to timely track the position of the focus and thereby getting tired easily and an accelerated rolling operation cannot be naturally performed on the canvas.

SUMMARY

In this regard, an interface controlling method and device is provided to solve previous problems.

An interface controlling method for controlling an interface, wherein the interface comprises a plurality of interface elements and the method comprises: acquiring an initial position of a first focus interface element; acquiring an first moving direction being inputted; selecting at least one interface element except the first focus interface element as a second focus interface element at the first moving direction starting from the first focus interface element; and moving the plurality of interface elements along a second moving direction opposite to the first moving direction so as to move the second focus interface element to the initial position.

An interface controlling method for controlling the interface, which comprises: acquiring an initial position of a first focus interface element; acquiring a first moving direction being inputted; if neither the first focus interface element nor an interface element as a second focus interface element to be selected is located at the edge of the interface, selecting at least one interface element except the first focus interface element as the second focus interface element at first moving direction starting from the focus interface element; and moving the plurality of interface elements along a second moving direction opposite to the first moving direction so as to move the second focus interface element to the initial position.

An interface controlling device configured to control the interface, wherein the interface comprises a container and a plurality of interface elements located in the container and the device comprises: a focus position acquiring unit configured to acquire an initial position of a first focus interface element; a moving direction acquiring unit configured to acquire a first moving direction being inputted; a selecting unit configured to select at least one interface element except the first focus interface element as a second focus interface element at the first moving direction starting from the first focus interface element; and a moving unit configured to move the plurality of interface elements along a second direction opposite to the first moving direction so as to move the second focus interface element to the initial position.

An interface controlling device configured to control the interface, which comprises: a focus position acquiring unit configured to acquire an initial position of a first focus interface element; a moving direction acquiring unit configured to acquire a first moving direction being inputted; a selecting unit configured to selecting at least one interface element except the first focus interface element as a second focus interface element at first moving direction starting from the first focus interface element if neither the first focus interface element nor the interface element to be selected as the second focus interface element is located at the edge of the interface; and a moving unit configured to move the plurality of interface elements along a second moving direction opposite to the first moving direction so as to move the second focus interface element to the initial position if neither the first focus interface element nor the interface element to be selected as the second interface element is located at the edge of the interface.

A computer-readable storage medium containing one or more programs, wherein the one or more programs include instructions, when the instructions are performed by an electronic device so as to enable the electronic device to perform a method comprising the steps of: acquiring an initial position of a first focus interface element; acquiring a first moving direction being inputted; selecting at least one interface element except the first focus interface element as a second focus interface element at the first moving direction starting from the first focus interface element; and moving the plurality of interface elements along a second moving direction opposite to the first moving direction so as to move the second focus interface element to the initial position.

A computer-readable storage medium containing one or more programs wherein the one or more programs include instructions, when the instructions are performed by an electronic device which perform a method comprising the steps of: acquiring an initial position of a first focus interface element; acquiring a first moving direction being inputted; if neither the first focus interface element nor the interface element to be selected as a second focus interface element is located at the edge of the interface, selecting at least one interface element except the first focus interface element as the second focus interface element at the first moving direction starting from the first focus interface element; and moving the plurality of interface elements along a second moving direction opposite to the first moving direction so as to move the first focus interface element to the initial position.

In the previous interface controlling methods and devices, the interface element in which the focus lies locates at the initial position by moving the interface elements along a second moving direction opposite to a first moving direction, and thus the position of the focus cannot be changed even if the focus has been moved. Therefore, it is unnecessarily for the user to frequently roll his eyes to follow the movement of the focus, thereby relieving eye fatigue.

In order to make previous and other purposes, characters and advantages of the present invention more apparently, preferable embodiments are described as following with reference to accompanied drawings.

BRIEF DESCRIPTION OF THE DRAWINGS

In order to more clearly illustrate the technical solutions of embodiments of the present disclosure, the drawings used for the description of the embodiments will be briefly introduced below. Apparently, the drawings in the description below merely illustrate some embodiments of the present disclosure, and other drawings can be made according to these drawings by those ordinary skilled in the art without creative work.

DETAILED DESCRIPTION OF CERTAIN EMBODIMENTS

The technical solutions in embodiments of the present disclosure will be clearly and thoroughly described below with reference to the accompanying drawings for the embodiments of the present disclosure. Apparently, the described embodiments are merely a part rather than all of embodiments of the present disclosure. Any other embodiment obtained by skilled person in the art based on the described embodiments of the present disclosure without creative efforts shall fall within the protection scope of the present disclosure.

Figure 1:
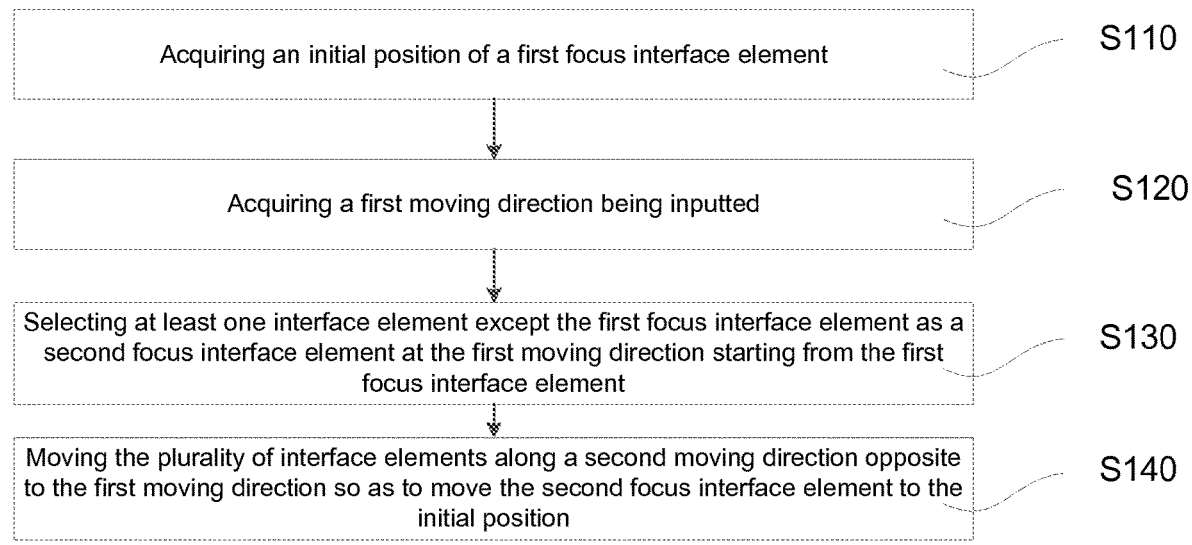
FIG. 1 is a flow chart showing an interface controlling method according to a first embodiment.

FIG. 1 is a flow chart showing an interface controlling method according to a first embodiment. The method is used to control movement of a focus on an interface of a controlled terminal by a remote-controller. The controlled terminal may be a digital television, a digital TV set-top box or other media players. The remote-controller may be a infrared remote controller, an electronic terminal equipped with remote-controller applications such as a smartphone, a tablet PC, or a dedicated smart remote-controller. In general, all the smartphone, the tablet PC or the smart remote-controller may include a touch screen.

As shown in FIG. 1, the method includes steps below.

Step S110, an initial position of a first focus interface element is acquired. In general, the interface includes a container and an interface element accommodated in the container. It can be understood, all of the interface elements which can contain other interface elements can be used as the interface containers. In other words, the interface container is a superior interface element of the current interface elements. For example, a canvas control in the Android operating system is usually used as an interface container. The above interface elements may include various buttons, labels, text boxes, images and the like. The focus interface element is, for example, a chosen interface element which is distinguished from other non-focus interface elements by being highlighted, framed, added a background or other distinguishing ways. The initial position of the focus interface element refers to a coordinate of the chosen interface element. The coordinate may be a relative coordinate relative to the container or an absolute coordinate in the display screen.

Step S120, a first moving direction being inputted is acquired.

The first moving direction is inputted by the remote-controller. For example, when the arrow key of the remote-controller is pressed, an infrared signal is sent out, the first moving direction can be acquired after analyzing the received infrared signal. Further, the remote-controller may be connected to the controlled terminal through a wireless network or other connecting ways. The remote-controller has a touch screen. Various gesture operations and trajectory data of the touch points may be detected by the remote-controller with touch screen. Then the remote-controller may send the detected gesture operations and the trajectory data to the controlled terminal according to a predetermined protocol. Therefore, Step S120 may further include sub-steps of: receiving the trajectory data of the touch points sent by the remote-controller; acquiring a trajectory direction by analyzing the trajectory data; and determining the first moving direction according to the trajectory direction.

The trajectory direction of the touch points may be acquired according to the coordinates of the points which the touch point trajectory passes through. It can be understood that the touch screen needs to be placed in a coordinate system to acquire the coordinates of the points. The first moving direction may be consistent with the trajectory direction. The trajectory direction within a predetermined range may be regarded as a single moving direction. For example, if an angle $\theta$ defined between the trajectory direction and a horizontal axis of the coordinate system is within a range of $-45°<\theta<45°$, the first moving direction is determined as a rightward direction toward right; if the angle $\theta$ is within a range of $45°<\theta<135°$, the first direction is determined as an upward direction; if the angle $\theta$ is within a range of $\theta>135°$ and $\theta<-135°$, the first direction is determined as a leftward direction; if the angle $\theta$ is within a range of $-135°<\theta<-45°$, the first moving direction is determined as a downward direction.

Step S130, at least one interface element except the first focus interface element is selected as a second focus interface element at the first moving direction starting from the first focus interface element.

The gestures of the present disclosure may be generally divided into three types such as a moving gesture, a scrolling gesture, and a flinging gesture, where the moving gesture means that when a finger touches and moves on a touch panel of a remote-controller, a view of the set top box is moved according to a direction and distance of the movement of the finger; the scrolling gesture means that when a finger moves away from the touch panel, if a moving speed of the finger is bigger than a threshold A and smaller than a threshold B, a view of the set top box is scrolled a corresponding distance of one row (column); and before the finger moves away from the touch panel of the remote-controller, the fling gesture is triggered when a moving speed of a finger is bigger than a threshold B, a moving distance of the view in the touch panel, which is triggered by the flinging gesture, is relative to the moving speed of the finger. The three types gestures are differed from 1 a sliding speed, wherein the sliding speed of the moving gesture is the slowest, the sliding speed of the flinging gesture is the fastest, the sliding speed of the scrolling gesture is between the sliding speed of the moving gesture and the sliding speed of the flinging gesture. Among the three types of gestures, only the scrolling gesture and the flinging gesture need to changing the focus. The focus may be moved to the next interface element along the sliding direction by each sliding operation. As for the flinging gesture, the number of grids passed by the focus is depending on the moving speed of the focus. The more faster the focus moves, the more n grids passed by the focus. A distance between any interface element and its adjacent interface element in any direction is deemed as one grid without considering the actual distance between them on the interface.

Therefore, Step S130 may specifically include sub-steps of: acquiring a moving speed of the touch point; determining the number of the grids passed by the focus according to the moving speed of the touch point; and moving the focus by the determined number of grids along the moving direction, that is, the interface element apart from the initial interface element by the determined number of grids is selected. The moving speed of the touch point may be sent to the controlled terminal after being acquired by the remote controller, or acquired by the controlled terminal. Specifically, a method for acquiring the moving speed of the touch point includes the following sub-steps of: receiving the trajectory data of the touch point sent by the remote-controller; and acquiring the moving speed of the touch point by analyzing the trajectory data of the touch point. For example, the moving distance of the touch point is acquired by analyzing the trajectory data of the touch point, and the moving speed of the touch point is obtained by dividing the moving distance of the touch point by a moving time. The remote-controller acquires the moving speed of the touch point in a similar way.

The movement of the focus may be realized in many ways. For example, the focus interface element is around by a border r so as to be distinguished from other interface elements. The border may be progressively moved to the next interface element. The focus interface element may be displayed with a gradient background so as to be distinguished from other interface elements. The background of the current focus interface element may be fade-out while a background of the next interface element may be fade-in. It can be understood, the way for moving the focus is not limited to the two ways described above, any focus moving technologies can be applied in the present embodiment.

Step S140, the plurality of interface elements are moved along a second moving direction opposite to the first moving direction so as to move the second focus interface element to the initial position.

Figure 2:
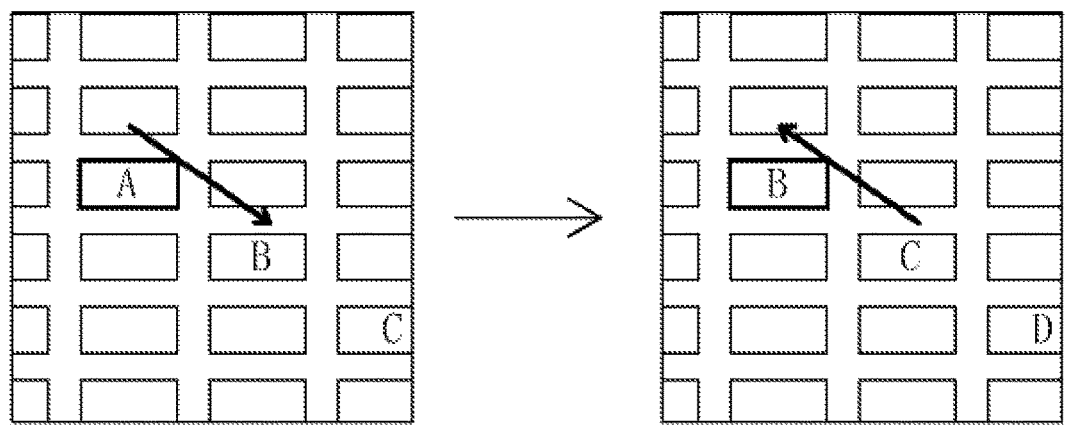
FIG. 2 is a schematic diagram showing an interface controlling method according to a second embodiment.

As shown in FIG. 2, in Step S120, the first direction is determined as the rightward direction (indicating by arrow 121), that is, the focus will be changed from an interface element A into an interface element B, while the focus is changed from the interface element A into the interface element B in Step S130. Meanwhile, in Step S140, the container is moved along a direction (indicating by arrow 122) opposite to the moving direction of the focus such that the interface element B is located on an original position of the interface element A, i.e. the initial position of the focus acquired in Step S110.

Further, it can be understood that Step S140 is not limited to be realized by moving the container, and also can be realized by simultaneously moving all the interface elements, which achieves the same effect as moving the container.

Further, only one first focus interface element is taken as an example for illustrating in the description above. However, the number of the focus interface elements may be more than one. The number of the interface elements selected as the second focus interface elements in Step S130 also may be more than one. In this situation, the position may be calculated according to one boundary or a geometric center of the plurality of interface elements.

In the interface controlling method according to the present embodiment, the interface element in which the focus lies locates at the initial position by moving a container along a direction opposite to the moving direction of the focus, and thus the position of the focus can not be changed even if the focus has been moved to the interface element B. Therefore, it is unnecessarily for the user to frequently roll his eyes to follow the movement of the focus, thereby relieving eye fatigue.

Figure 3:
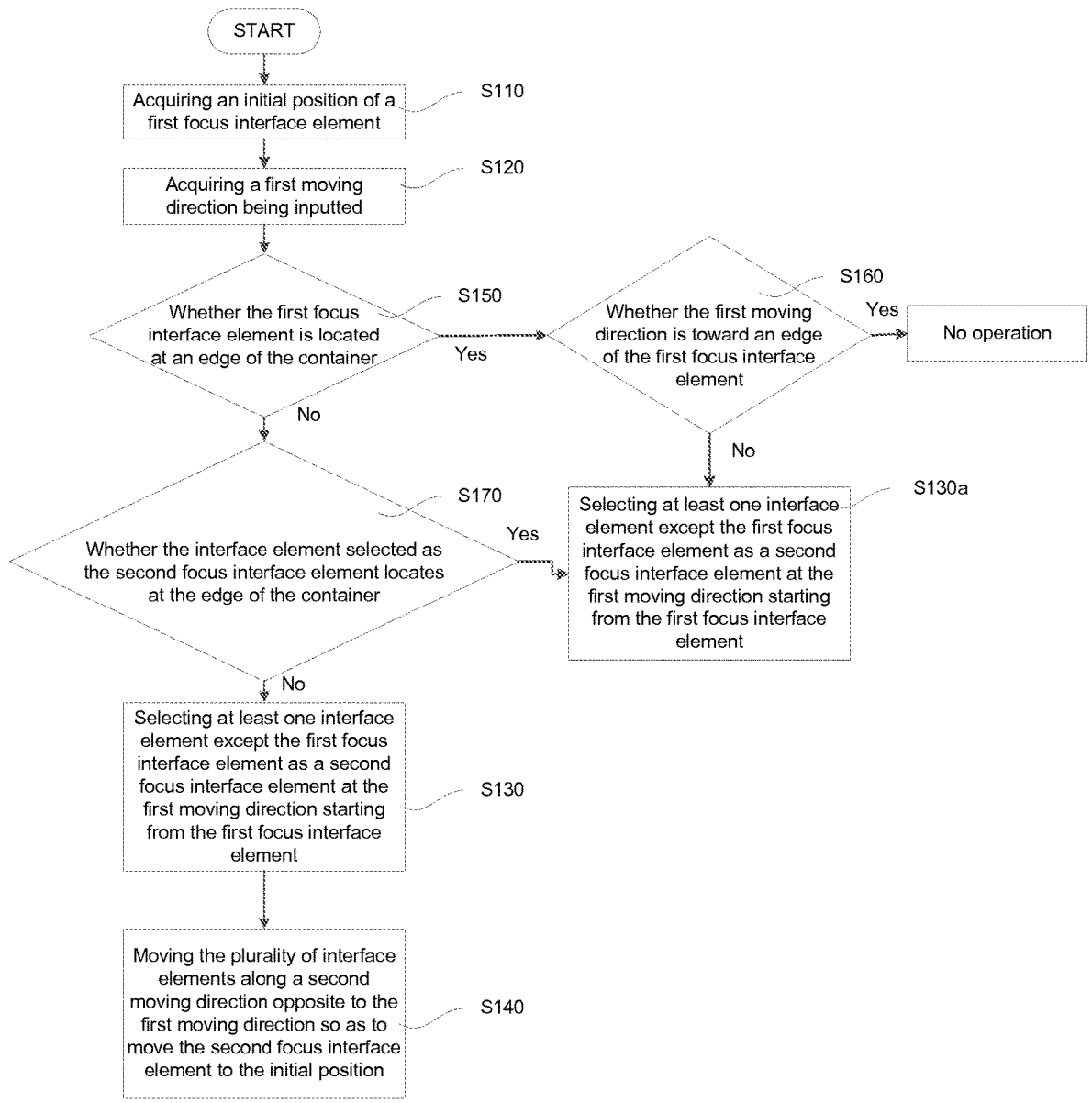
FIG. 3 is a flow chart showing an interface controlling method according to the second embodiment.

FIG. 3 is a flow chart showing an interface controlling method according to the second embodiment. Also referring to FIG. 1, the interface controlling method according to the second embodiment is similar to the interface controlling method according to the first embodiment except for Step S105 to Step S107 below:

Step S150 is for determining whether the first focus interface element is located at an edge of the container, if the first focus interface element is located at the edge of the container, the method proceeds to Step S160, otherwise, the method proceeds to Step S170.

Step S160 is for determining whether the first moving direction is toward an edge of the first focus interface element. Generally, the interface has a plurality of edges, and the edge of the focus interface element refers to the edge closest to the first focus interface element. If the first moving direction is toward the edge of the first focus interface element, no operation is performed and the method is ended, otherwise, the method proceeds to Step S130a. Step S130a is substantially the same as Step S130 of the first embodiment except for not performing Step S140 after the focus is moved in Step S130a. The relevant description of Step S130 can be referred here.

Step S170 is for determining whether the interface element selected as the second focus interface element locates at the edge of the container. If the interface element selected as the second focus interface element locates at the edge, the method proceeds to Step S130a. Otherwise, the method proceeds to Step S130. The step after Step S130 is as the same as the step in the first embodiment, namely performing Step S140 to move the container.

Comparing with the first embodiment, the interface controlling method of the present embodiment further includes a processing logic when the focus locates at the edge of the container or the focus is locates at the edge of the container after the focus is moved, so that the movement of the focus can maximally fitting for the using habits of the user in these particular situations.

Figure 4:
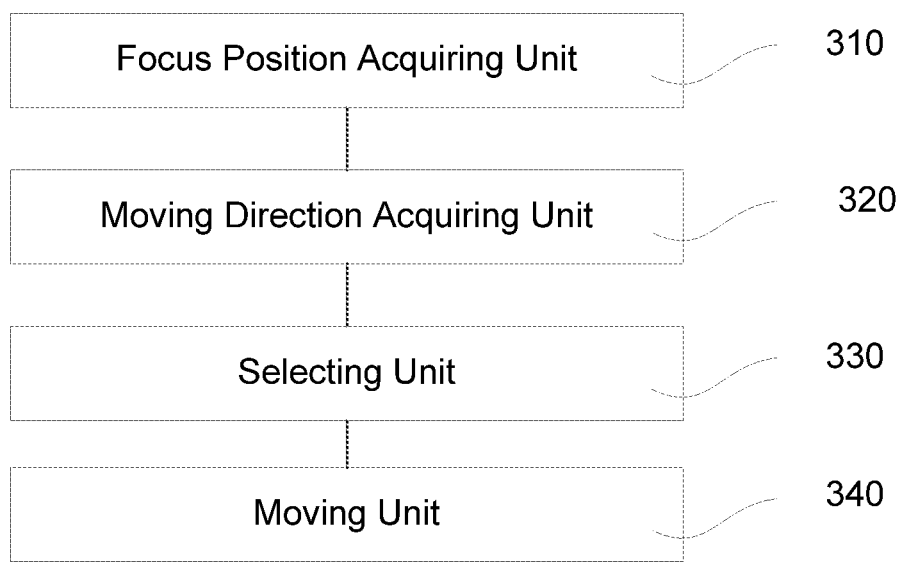
FIG. 4 is a block diagram showing an interface controlling method according to a third embodiment.

FIG. 4 is a block diagram of an interface controlling device according to a third embodiment. As shown in FIG. 4, the interface controlling device includes:

a focus position acquiring unit 310 configured to acquire an initial position of a first focus interface element;

a moving direction acquiring unit 320 configured to acquire a first moving direction being inputted;

a selecting unit 330 configured to select at least one interface element except the first focus interface element as a second focus interface element at the first moving direction starting from the first focus interface element; and a moving unit 340 configured to move the plurality of interface elements along a second direction opposite to the first moving direction so as to move the second focus interface element to the initial position.

Specifically, the moving direction acquiring unit 320 is configured to receive the trajectory data of the touch point sent by the remote-controller; acquire a trajectory direction by analyzing the trajectory data of the touch point; and determining the first moving direction of the focus by analyzing the trajectory direction.

The description of focus position acquiring unit 310, the moving direction acquiring unit 320, the selecting unit 330 and the moving unit 340 refer to FIG. 1, FIG. 2 and relevant description thereof.

In the interface controlling device according to the present embodiment, t the interface element in which the focus lies locates at the initial position by moving a container along a direction opposite to the moving direction of the focus, and thus the position of the focus cannot be changed even if the focus has been moved. Therefore, it is unnecessarily for the user to frequently roll his eyes to follow the movement of the focus, thereby relieving eye fatigue.

Figure 5:
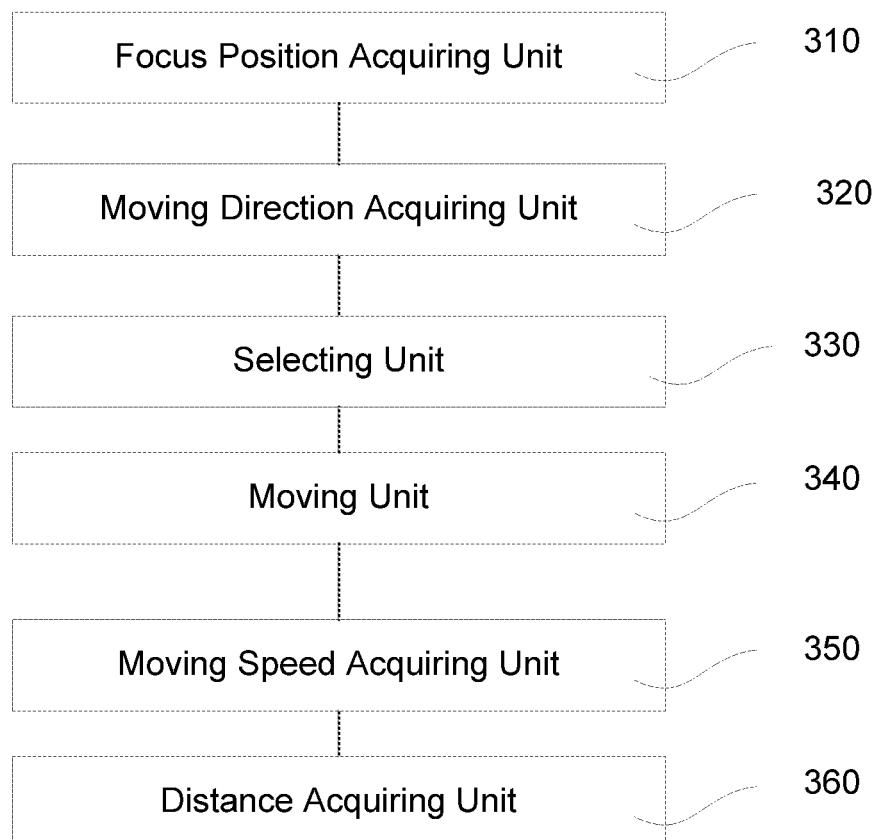
FIG. 5 is a block diagram showing an interface controlling method according to a fourth embodiment.

FIG. 5 is a block diagram showing an interface controlling device according to a fourth embodiment. Also referring to FIG. 4, the interface controlling device according to the fourth embodiment is similar to the interface controlling device according to the third embodiment except for following units included in the present embodiment:

a moving speed acquiring unit 350 configured to acquire a moving speed of the touch point; and a distance acquiring unit 360 configured to determine the number of grids to be moved according to a moving speed value.

After the distance acquiring unit 360 has determined the number of grids to be moved, the selecting unit 330 enables the focus to move by the determined number of grids along the first moving direction, that is, the interface element apart from the initial focus interface element by the determined number of grids is selected as the second focus interface element.

Specifically, the moving speed acquiring unit 350 is configured to receive trajectory data of the touch point sent by the remote-controller; acquire a moving speed of the touch point by analyzing the trajectory data of the touch point.

Further, the moving unit 340 is also configured to determine whether the first focus interface element is located at the edge of the interface and whether the interface element to be selected as the second focus interface element is located at the edge of the interface. If neither the first focus interface element nor the interface element to be selected as the second focus interface element is located at the edge of the interface, a plurality of interface elements are moved along the second moving direction opposite to the first moving direction so that the second focus interface element is moved to the initial position.

In the interface controlling device according to the present embodiment, by acquiring the moving speed of the touch point, the focus is moved by different numbers of the grids according to different moving speeds of the touch point, therefore, the process for moving the focus is more simply. In addition, a processing logic applicable to the focus locating at the edge of the container or the focus interface element being seleted locating at the edge of the container after moving, thus the movement of the focus may maximally fitting for the using habit in these particular situations.

Also, a computer-executable storage medium is provided by the embodiment of the present disclosure, the storage medium stores one or more programs containing instructions, if the instructions are performed by an electronic device, the electronic device will realize the interface controlling method according to the above embodiments. The computer-executable storage medium may be nonvolatile storage medium such as CD, disk and flash memory etc.

What is claimed is:

1. An interface controlling method for controlling an interface, wherein the interface comprises a plurality of interface elements and the method comprises:

acquiring an initial position of a first focus interface element on the interface;

acquiring a first moving direction being inputted;

determining that the first focus interface element is not located at any edge of the interface;

when the first focus interface element is not located at any edge of the interface, selecting at least one interface element except the first focus interface element as a second focus interface element at the first moving direction starting from the first focus interface element;

determining whether the at least one interface element selected as the second focus interface element is located at any edge of the interface;

when the second focus interface element is not located at any edge of the interface, moving the plurality of interface elements along a second moving direction opposite to the first moving direction so as to move the second focus interface element to the initial position; and when the second focus interface element is located at an edge of the interface, selecting the second focus interface element at the first moving direction without moving the interface containing the plurality of interface elements.

2. The method according to claim 1, further comprising:

determining that the first focus interface element is located at an edge of the interface;

determining whether the first moving direction is toward the edge of the interface where the first focus interface element is located; and when the first moving direction is not toward the edge of the interface, selecting at least one interface element except the first focus interface element as a second focus interface element at the first moving direction starting from the first focus interface element without moving the interface containing the plurality of interface elements;

wherein when the first moving direction is toward the edge of the interface, no operation is performed.

3. The method according to claim 1, wherein the acquiring the first moving direction being inputted comprises:

receiving trajectory data of a touch point sent by a remote-controller;

acquiring a trajectory direction by analyzing the trajectory data of the touch point; and determining the first moving direction based on the trajectory direction.

4. The method according to claim 3, wherein the selecting at least one interface element except the first focus interface element as a second focus interface element at the first moving direction comprises:
acquiring a moving speed of the touch point;
determining a number of grids to be moved according to the moving speed; and
selecting the at least one interface element that is located apart from the first focus interface element by the determined number of grids as the second focus interface element.

5. The method according to claim 4, wherein the acquiring the moving speed of the touch point comprises:
acquiring the moving speed of the touch point by analyzing the trajectory data of the touch point.

6. The method according to claim 3, wherein the moving the plurality of interface elements along a second moving direction opposite to the first moving direction so as to move the second focus interface element to the initial position comprises:
moving the plurality of interface elements along the second moving direction opposite to the first moving direction by the determined number of grids.

7. The method according to claim 1, wherein the moving the plurality of interface elements along a second moving direction opposite to the first moving direction so as to move the second focus interface element to the initial position comprises:
moving an interface container of the plurality of the interface elements along the second moving direction.

8. An interface controlling device configured to control an interface, wherein the interface comprises a plurality of interface elements and the device comprises:
a memory; and
a processor coupled to the memory and configured to perform:
acquiring an initial position of a first focus interface element on the interface;
acquiring a first moving direction being inputted;
determining that the first focus interface element is not located at any edge of the interface;
when the first focus interface element is not located at any edge of the interface, selecting at least one interface element except the first focus interface element as a second focus interface element at the first moving direction starting from the first focus interface element;
determining whether the at least one interface element selected as the second focus interface element is located at any edge of the interface;
when the second focus interface element is not located at any edge of the interface, moving the plurality of interface elements along a second moving direction opposite to the first moving direction so as to move the second focus interface element to the initial position; and
when the second focus interface element is located at an edge of the interface, selecting the second focus interface element at the first moving direction without moving the interface containing the plurality of interface elements.

9. The device according to claim 8, wherein the processor is further configured to perform:
determining that the first focus interface element is located at an edge of the interface;
determining whether the first moving direction is toward the edge of the interface where the first focus interface element is located; and
when the first moving direction is not toward the edge of the interface, selecting at least one interface element except the first focus interface element as a second focus interface element at the first moving direction starting from the first focus interface element without moving the interface containing the plurality of interface elements;
wherein when the first moving direction is toward the edge of the interface, no operation is performed.

10. The device according to claim 8, wherein the acquiring the first moving direction being inputted comprises:
receiving trajectory data of a touch point sent by a remote-controller;
acquiring a trajectory direction by analyzing the trajectory data of the touch point; and
determining the first moving direction based on the trajectory direction.

11. The device according to claim 10, wherein the selecting at least one interface element except the first focus interface element as a second focus interface element at the first moving direction comprises:
acquiring a moving speed of the touch point;
determining a number of grids to be moved according to the moving speed; and
selecting the at least one interface element that is located apart from the first focus interface element by the determined number of grids as the second focus interface element.

12. The device according to claim 11, wherein the acquiring the moving speed of the touch point comprises:
acquiring the moving speed of the touch point by analyzing the trajectory data of the touch point.

13. The device according to claim 11, wherein the moving the plurality of interface elements along a second moving direction opposite to the first moving direction so as to move the second focus interface element to the initial position comprises:
moving the plurality of interface elements along the second moving direction opposite to the first moving direction by the determined number of grids.

14. The method according to claim 8, wherein the moving the plurality of interface elements along a second moving direction opposite to the first moving direction so as to move the second focus interface element to the initial position comprises:
moving an interface container of the plurality of the interface elements along the second moving direction.

15. A non-transitory computer-readable storage medium containing one or more programs, wherein the one or more programs include instructions that, when being executed by a processor, cause the processor to perform:
acquiring an initial position of a first focus interface element on the interface;
acquiring a first moving direction being inputted;
determining that the first focus interface element is not located at any edge of the interface;
when the first focus interface element is not located at any edge of the interface, selecting at least one interface element except the first focus interface element as a second focus interface element at the first moving direction starting from the first focus interface element;
determining whether the at least one interface element selected as the second focus interface element is located at any edge of the interface;
when the second focus interface element is not located at any edge of the interface, moving the plurality of interface elements along a second moving direction opposite to the first moving direction so as to move the second focus interface element to the initial position; and when the second focus interface element is located at an edge of the interface, selecting the second focus interface element at the first moving direction without moving the interface containing the plurality of interface elements.

16. The storage medium according to claim 15, wherein the instructions further cause the processor to perform:

determining that the first focus interface element is located at an edge of the interface;

determining whether the first moving direction is toward the edge of the interface where the first focus interface element is located; and when the first moving direction is not toward the edge of the interface, selecting at least one interface element except the first focus interface element as a second focus interface element at the first moving direction starting from the first focus interface element without moving the interface containing the plurality of interface elements;

wherein when the first moving direction is toward the edge of the interface, no operation is performed.

17. The storage medium according to claim 15, wherein the acquiring the first moving direction being inputted comprises:

receiving trajectory data of a touch point sent by a remote-controller;

acquiring a trajectory direction by analyzing the trajectory data of the touch point; and determining the first moving direction based on the trajectory direction.

18. The storage medium according to claim 17, wherein the selecting at least one interface element except the first focus interface element as a second focus interface element at the first moving direction comprises:

acquiring a moving speed of the touch point;

determining a number of grids to be moved according to the moving speed; and selecting the at least one interface element that is located apart from the first focus interface element by the determined number of grids as the second focus interface element.

19. The storage medium according to claim 18, wherein the acquiring the moving speed of the touch point comprises:

acquiring the moving speed of the touch point by analyzing the trajectory data of the touch point.

20. The storage medium according to claim 18, wherein the moving the plurality of interface elements along a second moving direction opposite to the first moving direction so as to move the second focus interface element to the initial position comprises:

moving the plurality of interface elements along the second moving direction opposite to the first moving direction by the determined number of grids.

* * * * *